United States Patent [19]

Grikis et al.

[11] Patent Number: 4,606,455
[45] Date of Patent: Aug. 19, 1986

[54] COLLATED FASTENER STRIP

[75] Inventors: Raimonds Grikis, Morton Grove; Allen R. Obergfell, Des Plaines, both of Ill.

[73] Assignee: Duo-Fast Corporation, Franklin Park, Ill.

[21] Appl. No.: 642,066

[22] Filed: Aug. 17, 1984

[51] Int. Cl.⁴ .............................................. B65D 85/24
[52] U.S. Cl. ................................. 206/347; 206/485; 227/136
[58] Field of Search ............... 206/343, 346, 347, 329, 206/330, 331, 485, 443, 446; 227/136, 46, 137; 224/918; 24/3 F, 10 R; 221/70, 74

[56] References Cited

U.S. PATENT DOCUMENTS

| | | | |
|---|---|---|---|
| 3,097,360 | 7/1963 | Carlson, Jr. et al. | 206/346 |
| 3,438,487 | 4/1969 | Gallee et al. | 206/347 |
| 3,450,255 | 6/1969 | Mosetich | 206/347 |
| 3,538,673 | 11/1970 | Mosetich et al. | 206/347 |
| 3,841,472 | 10/1974 | Fuller et al. | 206/329 |
| 3,885,669 | 5/1975 | Potucek | 206/347 X |
| 3,930,297 | 1/1976 | Potucek et al. | 227/136 X |
| 4,014,488 | 3/1977 | Potucek et al. | 227/136 X |
| 4,349,106 | 9/1982 | Bögel | 206/347 |
| 4,383,608 | 5/1983 | Potucek | 206/347 |

Primary Examiner—William Price
Assistant Examiner—Byron Gehman
Attorney, Agent, or Firm—Mason, Kolehmainen, Rathburn & Wyss

[57] ABSTRACT

A collated fastener strip includes an elongated flexible plastic web having a row of projecting tabs along one or both of its elongated edges. Each tab is provided with an open ended slot with an opening intermediate its end in which is frictionally retained the shank of a nail or screw. The opening is of a quadrilateral configuration to provide improved frictional contact with the fastener shank. The location of the opening intermediate the ends of the slot divide the tab into two arms that can be deflected to accommodate fasteners of different sizes while retaining adequate frictional engagement therewith.

5 Claims, 7 Drawing Figures

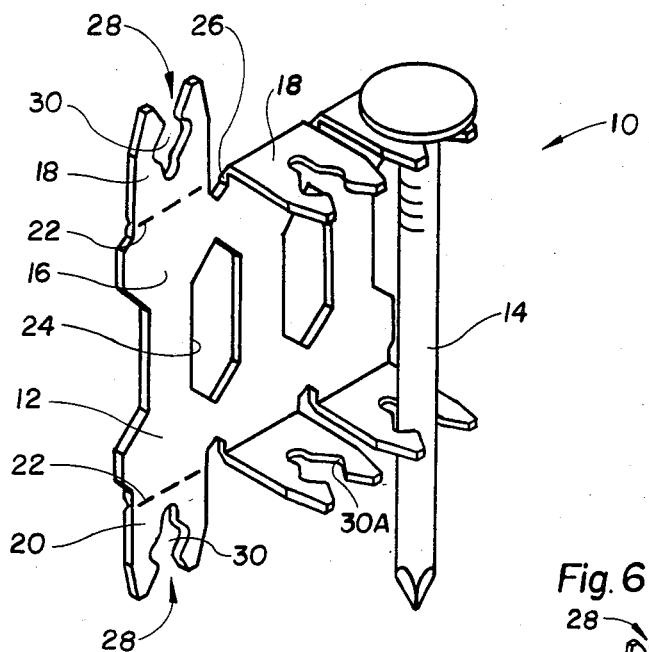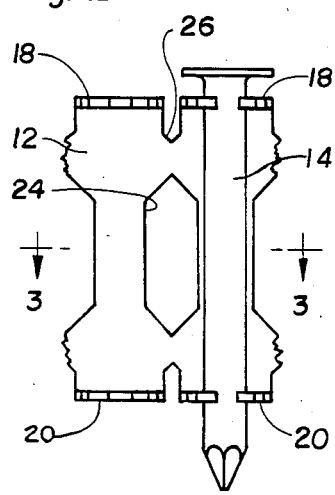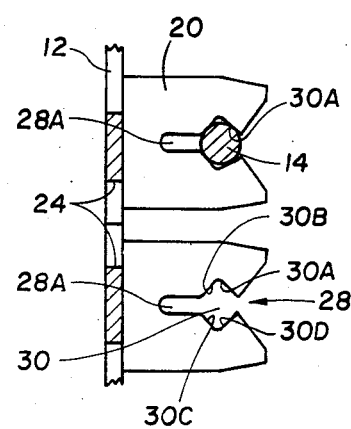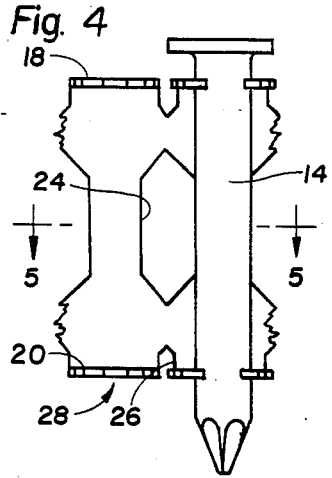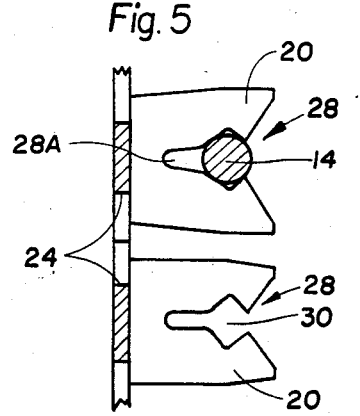

COLLATED FASTENER STRIP

BACKGROUND OF THE INVENTION

A. Field of the Invention

The present invention relates to a collated fastener strip and, more particularly, to an improved strip with a carrier or tape capable of detachably mounting a large variety of nails and screws in a more positive manner than before.

B. Description of the Background Art

The commercial success of powered nail and screw driving tools led to the desire for a magazine containing ever larger quantities of fasteners so collated as to avoid the generation of any debris during a fastener driving operation. U.S. Pat. Nos. 3,438,487 and 3,450,255 disclose a flexible plastic tape having an elongated web carrying two parallel rows of spaced tabs along opposite edges. The free ends of the tabs are slotted and terminate in circular openings into spaced pairs of which the shanks of nails are inserted to detachably mount nails on the carrier. U.S. Pat. No. 4,383,608 discloses a carrier with modified tabs and a carrier with only a single row of tabs.

The nails are frictionally retained within the tabs until separated therefrom by contact with a driver blade of a powered nailer. Since the nail carrier, usually in a coiled form, is carried in a magazine on the tool, the nails are subject to forces resulting from the tool operation and handling that tend to dislodge them from the tabs with the result that the nails cannot be properly driven. To avoid this, the diameter of the circular openings in the tabs is made as close as possible to the diameter of the nail shanks. This permits nail insertion without fracturing or distorting the plastic arms defining the slots, while affording as large a frictional force as possible. However, the matching of the diameter of the nail shanks and the tab openings requires a manufacturer to inventory as many different sizes of tape or carrier as there are different nail diameters. In addition, it is difficult to visually distinguish carriers or tapes for nails having diameters that are as similar as 0.086 inch and 0.092 inch, for example.

These flexible plastic tapes or carriers have also been modified for use with threaded fasteners such as screws. As an example, U.S. Pat. No. 3,885,669 discloses such a tape with slotted tabs having a terminating opening whose diameter is proportional to the major and minor thread diameters of, for example, a drywall screw. At times, when the major thread diameter is greater than the diameter of the tab opening and the thread pitch is equal to or greater than the tab material thickness, the thread crest engages the tab edge and provides only point contact. This reduces the area and quantity of frictional engagement between the screw and the tab with the result that the position of the screw on the tab or carrier changes during shipment or handling of the powered screwdriver. This causes problems in both feeding and driving the screws.

SUMMARY OF THE INVENTION

Accordingly, one object of the present invention is to provide a new and improved fastener strip.

Another object is to provide a flexible carrier capable of detachably carrying in predetermined positions a number of different sizes of fasteners.

Another object is to provide a flexible carrier of the type having an elongated web with projecting tabs along the edge in which is formed a multi-sided opening for receiving fasteners.

A further object is to provide a fastener carrier of the type having an elongated web with projecting tabs along the edge in which a fastener-receiving opening is formed intermediate the ends of the slots in the tabs to provide means for holding fasteners of different sizes.

An additional object is to provide a flexible carrier with projecting tabs having quadrilateral openings therein providing two pairs of V-shaped edges for holding and centering fasteners carried on the tabs.

In accordance with these and many other objects, a carrier embodying the present invention includes an elongated flexible plastic web portion having a row of transversely extending spaced tabs along each of its edges. The tabs are each provided with an open ended slot having a fastener shank-receiving opening disposed intermediate the ends of the slots. The opening is defined by a plurality of straight line segments to form a number of surfaces or edges for engaging the shank of either a screw or a nail to frictionally retain the fastener in place on the carrier. In a preferred embodiment, the opening is defined by quadrilateral to provide two V-shaped edges for centering the fastener shank within the opening. The web of the carrier can include tabs along one or both of its longitudinally extending edges.

The flexibility imparted to the tab by the extension of the slot beyond the fastener-receiving opening permits a carrier or tape with openings of a given dimension to accept and properly retain a number of fasteners with different effective diameters. The straight edges defining the opening provide an increased number of points of contact with cylindrical fasteners and provide an improved chance of avoiding a thread crest and engaging a root area on threaded fasteners. The V-shaped edges of the preferred quadrilateral opening assure centering of the fastener relative to the tabs and thus to the driving instrumentality of the tool with which the carrier is being used.

BRIEF DESCRIPTION OF THE DRAWINGS

Many other objects and advantages of the present invention will become apparent from considering the following detailed description in conjunction with the drawings in which:

FIG. 1 is a perspective view of a segment of carrier tape or strip constructed in accordance with the present invention;

FIG. 2 is a front elevational view of a portion of FIG. 1 illustrating a nail of a given diameter carried on the strip;

FIG. 3 is a sectional view taken along line 3—3 in FIG. 2;

FIG. 4 is a front elevational view similar to FIG. 2, but illustrating a larger diameter fastener carried on the carrier tape or strip;

FIG. 5 is a sectional view taken along line 5—5 in FIG. 4;

FIG. 6 is a perspective view similar to FIG. 1 illustrating a threaded fastener or screw carried on the carrier or tape; and FIG. 7 is a perspective view of a portion of a strip similar to FIG. 6 comprising a further embodiment of the invention.

DETAILED DESCRIPTION OF THE PREFERRED EMBODIMENT

Referring now more specifically to FIG. 1 of the drawings, therein is illustrated a segment of a fastener strip or coil indicated generally as 10 which embodies the present invention and which includes a flexible plastic carrier 12 on which a plurality of fasteners, such as a plurality of nails 14, are detachably mounted. The fastener strip 10 is adapted to be used in, for example, a pneumatic nailer of the type shown in U.S. Pat. No. 3,543,987 in which means are provided for sequentially indexing the fastener strip or coil 10 step-by-step so that successive fasteners or nails 14 are advanced to a position to be driven into a workpiece. During the driving operation, a generally circular or cylindrical shank of the nail 14 is separated from the carrier 12, and the carrier 12 is advanced toward an exit from the tool.

In general, the carrier 12 is formed of flexible plastic material and includes an elongated web portion 16 along an upper edge of which is disposed a plurality of spaced tabs 18, and along the lower edge of which is disposed a plurality of spaced tabs 20. The tabs 18, 20 are folded along a hinge portion indicated generally at 22 to extend generally transverse or out of the plane of the elongated web 16. The web 16 is also provided with a series of feed openings 24 and notches 26 to facilitate tearing of the web 16 so as to separate expended portions of this web from the remaining supply containing additional nails 14. The general construction of the web 16 and the tabs 18, 20, the feed openings 24, and the tear notches 26 is shown and described in detail in U.S. Pat. Nos. 3,438,487 and 3,450,255.

Referring now more specifically to the tabs 18, 20, each of these tabs is provided with an open-ended slot indicated generally as 28 extending inwardly from the outer free end of the tab 18, 20 toward the hinge portion 22. Intermediate the ends of the slot 28 is a fastener-receiving opening indicated generally as 30. In the preferred embodiment, the opening 30 is formed as a quadrilateral defined by four straight line segments 30A, 30B, 30C, and 30D. The straight line segments 30A, 30B and 30C, 30D are connected by a radius portion. The lengths of the individual sides 30A, 30B, 30C, 30D are determined by the size of the fastener with which the carrier 12 is to be used. In one embodiment in which the strip 10 is to be formed using different nails 14 having diameters of 0.120–0.131 inch, the opening 30 is formed as a quadrilateral or, more specifically, a square with sides of the length 0.113 inch. The nail 14 can be automatically inserted into the tabs 18, 20 using a collator of the type shown in U.S. Pat. No. 3,538,673.

Referring now more specifically to FIGS. 2 and 3 of the drawings, therein is illustrated a fastener strip or coil 10 in which the nail 14 has, for example, a diameter of 0.120 inch in the example assumed above. The four sides or edges 30A–30D defining the opening 30 bear against the adjacent walls of the shank of the nail 14 and center this nail within the vertically aligned openings 30 in the tabs 18, 20. Four points of frictional engagement are provided inasmuch as the two wall segments 30A, 30B and 30C, 30D provide in essence two "V" structures for engaging and supporting the shank of the nail 14 precisely centered within the openings 30 in the tabs 18, 20. If, for example, the opening 30 had been defined by the arcuate surfaces of the prior art and if there were any discrepancy between the precise diameter of the circular opening and the more or less circular cross-section of the shank of the nail 14, no more than two points of contact would have been provided.

FIGS. 4 and 5 of the drawings illustrate the manner in which fasteners of different sizes can be used in the same carrier or tape 12. In FIG. 4 assuming the representative example above, the nail 14 has a diameter of 0.131 inch and can be inserted through the tapered outer opening of the slot 28 into nail receiving openings 30 in the spaced tabs 18, 20. The cylindrical outer surface of the shank of the nail 14 is again engaged by the four edges or surfaces 30A–30D defining the opening 30 so that the shank of the nail 14 is again centered within the opening 30, and four points of contact or frictional engagement are again provided on the nail by each of the tabs 18, 20. However, it should be noted that the inner extension 28A of the slot 28 in the tabs 18, 20 permits the outward deflection of the free ends or arms of the tabs 18, 20 to accommodate the increased diameter of the shank of the nail 14. For instance, compare the configuration of the tabs 20 shown in FIG. 5 with the upper tab 20 containing the shank of the nail 14 being deflected outwardly, while the configuration of the tab 20 that does not contain a nail 14 remains in the configuration shown in FIGS. 1–3.

FIG. 6 illustrates a further embodiment of the invention in which a fastener strip indicated generally as 40 is provided having a threaded fastener or screw 42 carried in the tabs 18, 20 on the carrier 12. The fastener strip 40 can be provided in discrete strips or in coils. These strips or coils are used to provide screws for automatic feeding and driving in tools of the type shown and described in detail in U.S. Pat. Nos. 3,910,324; 3,930,297; and 4,014,488.

The fastener strip 40 is formed in much the same manner as the fastener strip 10, except that screws or threaded fasteners 42, rather than nails 14, are inserted into the tabs 18, 20, by the inserting or collating apparatus referred to above. The dimensions of the open end slots 28 and the fastener-receiving openings 30 are proportioned in accordance with the dimensions of the screws 42 to be collated, in particular the major and minor diameters of the screw. The provision of the extension or inner end portion 28A of the slots 28 again permits the tabs 18, 20 to be used with screws 42 of varying diameters. In addition, the four point contact provided by the four edges or surfaces 30A–30D in the fastener-receiving opening 30 improves the probability that one of these edges or surfaces will be disposed in a root area of the thread during insertion of the screw 42 to provide improved frictional contact for maintaining the screw 42 in its desired position on the carrier 42. With the circular or arcuate walls previously used to form the fastener-receiving opening in the tabs 18, 20, the probability of the thread crest engaging the wall at a single point was relatively high. This frequently resulted in less positive positioning of the screw 42 on the carrier 12 than would be desired.

FIG. 7 of the drawings illustrates a fastener strip 50 similar to the strip 40 in which all of the tabs 20 have either been removed or not formed on the carrier 12 during fabrication. The threaded fasteners or screws 52 are inserted through the slots 28 to be received within the locating openings 30 in the upper tabs 18. The fastener driving strip 50 can be driven in tools of the same type described above, and screws 52 can be collated on the carrier 12 using apparatus of the type shown and described in detail in the above-identified patent. The fastener strip 50 is generally used when shorter screws 52 are to be collated.

Although the present invention has been described with reference to several embodiments thereof, it will be apparent that numerous other modifications and embodiments can be devised by those skilled in the art which will fall within the spirit and scope of the present invention.

What is claimed and sought to be secured by Letters patent of the United States is:

1. A carrier for a series of fasteners of the type having an integral body of flexible plastic material with an elongated web portion and a first plurality of spaced tabs extending in a first direction transverse to the web along a first elongated edge thereof, the improvement which comprises an open-ended slot extending in each of said first plurality of tabs in said first direction such that the center line of said slot is perpendicular to said first elongated edge and including an enlarged opening defined by a plurality of straight line segments, said opening including two generally V-shaped edges on opposite sides of the slot, the apexes of said V-shaped edges being positioned in a line in a second direction transverse to said first direction and the leg portions of each of said V-shaped edges being of substantially equal length.

2. The carrier set forth in claim 1 in which
each of said first plurality of tabs includes a further slot extending from said enlarged opening toward said web, said further slot being in alignment in said first direction with said open-ended slot.

3. The carrier set forth in claim 1 including a second plurality of spaced tabs formed along an opposite second elongated edge of said web portion and extending in said first direction transverse to the web, each of said second plurality of tabs having an open-end slot and including an enlarged opening defined by a plurality of straight line segments with the center line of each said slot being perpendicular to the second elongated edge, said opening including two generally V-shaped edges on opposite sides of the center line of said slot, the apexes of said V-shaped edges being positioned in a line parallel to said second direction and the leg portions of each of said V-shaped edges being of substantially equal length.

4. A collated fastener strip comprising
an elongated carrier web of flexible material having a plurality of feeding means spaced apart along the length of said carrier web,
a plurality of tabs along an edge of said carrier web, each of said tabs projecting generally transverse to the carrier web,
an open-ended slot in each of said tabs dividing the tab into two arms,
a fastener receiving opening defined by a pair of oppositely facing V-shaped edges on said pair of arms in each of said tabs intermediate the ends of the slot, said opening dividing said slot into first and second slot portions, the center lines of said first and second slot portions and the center line of said opening being in alignment with each other, being transverse to the elongated axis of said web and being equidistant between a pair of adjacent feeding means, and
a plurality of fasteners removably mounted on the carrier web, each of said fasteners having a shank disposed in one of said openings to be frictionally retained therein by said arms such that the center line of each of said fasteners is maintained a fixed distance from said carrier web and is positioned equidistant between adjacent ones of said feeding means.

5. The collated fastener strip set forth in claim 4 in which
two rows of spaced tabs are provided along opposite edges of said web, and
the shank of each fastener is received in an opening in a tab in each of said rows.

* * * * *